United States Patent
Liu et al.

(10) Patent No.: US 6,424,978 B1
(45) Date of Patent: *Jul. 23, 2002

(54) FORMATTING CARD-BASED HYPERMEDIA DOCUMENTS BY AUTOMATIC SCRIPTING

(75) Inventors: Peiya Liu, East Brunswick; Liang-Hua Hsu, Robbinsville, both of NJ (US); Kenneth Hampel, Yardley, PA (US)

(73) Assignee: Siemens Corporate Research, Inc., Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,270

(22) Filed: Dec. 5, 1997

(51) Int. Cl.[7] ................................................ G06F 7/00
(52) U.S. Cl. ..................................... 707/501.1; 707/523
(58) Field of Search ................................ 707/501, 522, 707/523, 524, 514, 515

(56) References Cited

U.S. PATENT DOCUMENTS

| | | | | |
|---|---|---|---|---|
| 5,173,853 A | * | 12/1992 | Kelly et al. | 707/530 |
| 5,210,824 A | * | 5/1993 | Putz et al. | 707/523 |
| 5,228,123 A | * | 7/1993 | Heckel | 345/334 |
| 5,299,304 A | * | 3/1994 | Williams et al. | 707/523 |
| 5,664,209 A | * | 9/1997 | Ueda et al. | 707/523 |
| 5,708,826 A | * | 1/1998 | Ikeda et al. | 707/501 |
| 5,708,828 A | * | 1/1998 | Coleman | 707/523 |
| 5,734,871 A | * | 3/1998 | Kleinerman et al. | 709/320 |
| 5,801,687 A | * | 9/1998 | Perterson et al. | 345/302 |
| 5,819,092 A | * | 10/1998 | Ferguson et al. | 395/701 |
| 5,860,073 A | * | 1/1999 | Ferrel et al. | 707/522 |
| 5,870,552 A | * | 2/1999 | Dozier et al. | 709/219 |
| 5,894,558 A | * | 4/1999 | Falker | 709/239 |
| 5,987,256 A | * | 11/1999 | Wu et al. | 395/707 |
| 6,108,676 A | * | 8/2000 | Nakatsuyama | 707/522 |
| 6,141,003 A | * | 10/2000 | Chor et al. | 345/327 |

OTHER PUBLICATIONS

Leland, Jon, DeBabelizer Pro for Windows, Computer Graphics World, p. 1–3, Apr. 1, 1997.*
Rosenthal, Steve, Convert It!: from HyperCard to ToolBook, PC magazine, p. 1–3, Nov. 13, 1990.*
Michel, Steve, Apple HyperCard 2.2 plays with a full deck, MacWeek, p. 1–4, Mar. 21, 1994.*
West Nick, Multimedia—a guide to the pros and cons, MacWorld, p. 114–115, Mar. 1993.*
Multimedia Authoring Tools, Rabin et al, CHI, 1996, pp. 380–381.*

* cited by examiner

Primary Examiner—Stephen S. Hong
Assistant Examiner—Cesar B. Paula
(74) Attorney, Agent, or Firm—Donald B. Paschburg

(57) ABSTRACT

An automatic formatting system programmatically creates an electronic file format for card-based hypermedia documents without the knowledge of the target document format. The script-based formatting system includes an automated method for generating formatting scripts which, at run-time, are used by a commercial authoring tool to generate the document file format. With this approach, it is possible to take advantage of the script interpreter capabilities rather than interactive editing capabilities in authoring tools. The system includes a mixer where descriptions about documents are obtained by attaching formatting commands to document contents through a pre-processing procedure. The descriptions are input to an automatic scripting module which generates formatting scripts. The automatic scripting module includes an HCF generator and a formatting script interpreter. At run-time the formatting scripts are executed by the authoring tools' script interpreter to generate card-based hypermedia documents.

9 Claims, 6 Drawing Sheets

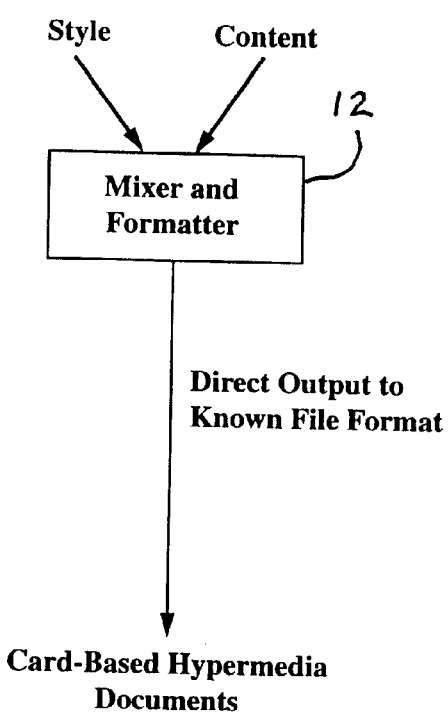
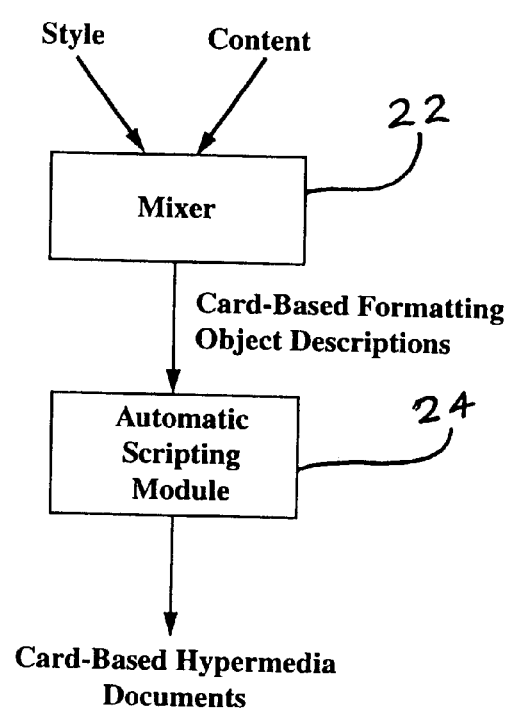
Figure 1
Figure 2
PRIOR ART

```
<CardFormattingBook property= . . . >
    <Resource property= . . . > . . . </Resource>
    <Resource property= . . . > . . . </Resource>
    . . .
    <MainViewer property= . . . >
        <StartBkgnd property= . . . >
            <object property= . . . >
            . . .
            <StartPage property= . . . >
                <Object property= . . . >
                . . .
            </StartPage>
            <NexPage property= . . . >
                <Object property= . . . >
                . . .
            </NextPage>
            <NextPage property= . . . >
                <Object property= . . . >
                . . .
            </NextPage>
            . . .
        </StartBkgnd>
        <NextBkgnd property= . . . > . . . </NextBkgnd>
        .. . .
    </MainViewer>
    <Viewer property= . . . > . . . </Viewer>
    <Viewer property= . . . > . . . </Viewer>
        ...
<CardFormattingBook>
```

Figure 5

FORMATTING CARD-BASED HYPERMEDIA DOCUMENTS BY AUTOMATIC SCRIPTING

BACKGROUND OF THE INVENTION

1. Field of the Invention

The present invention relates to hypermedia authoring tools and more particularly to automatic formatting for creating an electronic file format for card-based hypermedia documents without the knowledge of the target document format.

2. Description of the Prior Art

Traditionally, hypermedia applications and documents are interactively designed and created with hypermedia authoring tools. These tools store the documents in a file format that is often closed and proprietary. Typically, formatting commands are attached to document objects interactively, and the proprietary format representation is generated and saved in a file when the user selects a "Save" command from the user interface. Various commercial authoring tools may use different interactive authoring paradigms but there are limitations in directly supporting an automatic formatting process. The representative authoring tools are summarized as follows.

Authorware from Macromedia and IconAuthor from AimTech, based on a flowchart model, use icons representing events such as audio or video, if-then functions, branching and hyperlinks in a linear progression like flowchart control. The user could use content editors to assign real media files and properties to each icon. This model provides a high-level program control and global ordering of information presentation.

Director from Macromedia, based on a time-line model, displays media sequences as tracks and specializes in synchronizing events. It can be used to create high-level multimedia presentation.

Multimedia Toolbook from Asymetrix, based on an object-oriented model with scripting capability, provides more support of complex interaction behavior. Users can interactively enter document content (in multimedia objects) and define object properties including various formatting commands and scripts for object behavior. It also provides a complete programmatic mechanism to authoring the objects. That is, for any interactive authoring operations, there is a corresponding script command for programmatic authoring. Script-based authoring allows the user to get to lower-level control of object and system behavior with script commands, as opposed to interactive commands.

Powerpoint from Microsoft, based on a structure-oriented model, supports hierarchical information content authoring in a 2D layout. Many commercial word processing tools follow this authoring model. Documents are often developed in terms of hierarchal structures such as book, pages or slides, sections, subsections, etc., and WYSWIG user interfaces are provided to support structure editing, and issue formatting commands interactively.

SUMMARY OF THE INVENTION

The present invention provides a new approach of automatic formatting for creating an electronic file format for card-based hypermedia documents without the knowledge of the target document format. An automatic formatting process is a process to programmatically create a document file format for hypermedia documents. However, if the file format is closed and proprietary as in commercial hypermedia authoring tools, creating such a document file format directly in an automatic formatting process is not possible. The script-based formatting process of the present invention includes an automated method for generating formatting scripts which, at run-time, are used by a commercial authoring tool to generate the document file format. With this approach, it is possible to take advantage of the script interpreter capabilities rather than interactive editing capabilities in authoring tools. Without support of such an automatic formatting mechanism, creating large-scale card-based hypermedia documents with interactive authoring tools becomes a monumental and tedious job.

The present invention comprises a mixer where descriptions about document objects, called formatting object descriptions, are obtained by attaching formatting commands to document contents through a pre-processing procedure. The formatting object descriptions are input to an automatic scripting module which generates formatting scripts. The automatic scripting module includes a Hypermedia Card Format (HCF) generator and a formatting script interpreter. At run-time, the formatting scripts are used by a commercial authoring tool to generate the document file format. The formatting scripts are executed by the authoring tools' script interpreter to generate card-based hypermedia documents.

BRIEF DESCRIPTION OF THE DRAWINGS

FIG. 1 illustrates block diagram of direct formatting, a prior art formatting approach.

FIG. 2 illustrates a block diagram of script-based formatting, the formatting approach of the present invention.

FIG. 5 illustrates a structured formatting object description.

DETAILED DESCRIPTION OF THE INVENTION

An automatic formatting process is used to programmatically generate card-based hypermedia documents for large-scale document authoring by attaching formatting commands and behavior to existing multimedia contents automatically. FIG. 1 illustrates the prior art formatting approach of direct formatting which generates the formats that can be used directly by the authoring tools. Style and content is input to mixer/formatter 12 which provides a direct output to a known file format. Direct formatting is often not well supported due to the use of proprietary formats in commercial hypermedia authoring tools.

The present invention provides an alternative approach, called script-based formatting, that automatically generates the scripts to control the authoring tools to actually format the documents. In order to make use of the tools' powerful rendering and interactive run-time capabilities, the goal is to automatically attach formatting commands to existing multimedia information in a way that commercial tools can accept as input. But since the proprietary formats are generally not accessible, the present invention provides a formatting process that generates the scripts to format card-based hypermedia documents for a specific tool without knowing the tool's proprietary file format.

FIG. 2 illustrates the script-based formatting process of the present invention. As in the prior art formatting approach, style and content are once again the inputs, however with the approach of the present invention, they are input to mixer 22. At mixer 22, descriptions about document objects, called card based formatting object descriptions, with proper relationships and property values, are obtained by attaching formatting commands to document contents through a pre-processing procedure. The types of card-based hypermedia document objects can be a book, card background, card foreground, button, line, text field, picture, icon, etc. Each type of object has certain properties such as color, size, bounds, behavior, etc., to characterize the type of document objects.

The formatting object descriptions are an input to automatic scripting module 24 which generates formatting scripts from the formatting object descriptions. At run-time, the formatting scripts are used by a commercial authoring tool to generate the document file format. The present invention takes advantage of the script interpreter capabilities rather than the interactive editing capabilities of the authoring tools. Formatting scripts are executed by the authoring tools' script interpreter to generate card-based hypermedia documents. This approach is based on a procedural, rather than declarative, formatting description scheme to control the procedure of generating card-based hypermedia document file formats. This approach is also based on an operational definition of the format-creation scripts.

Figure 3:
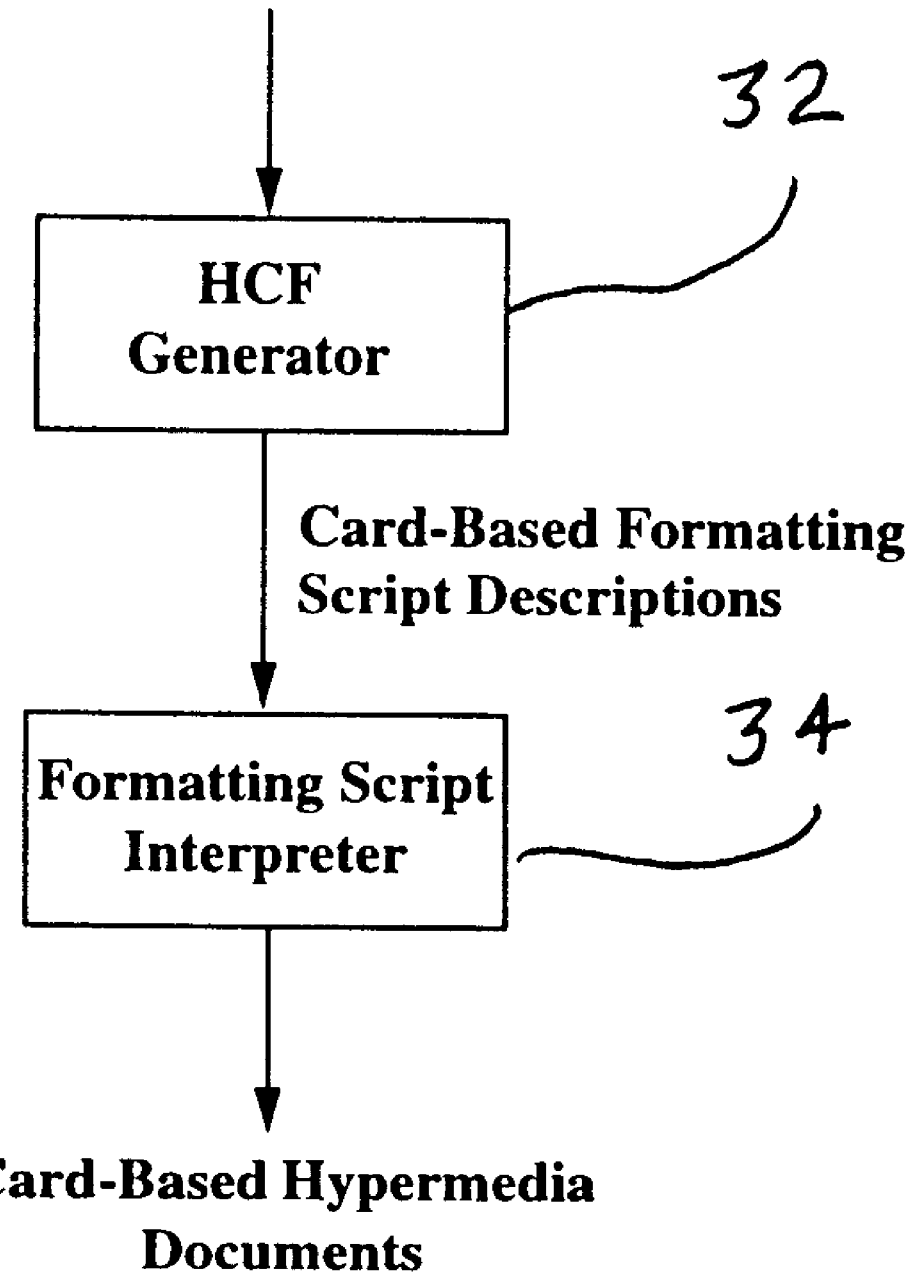
FIG. 3 illustrates a block diagram of the automatic scripting module for the formatting process of the present invention.
Figure 6:
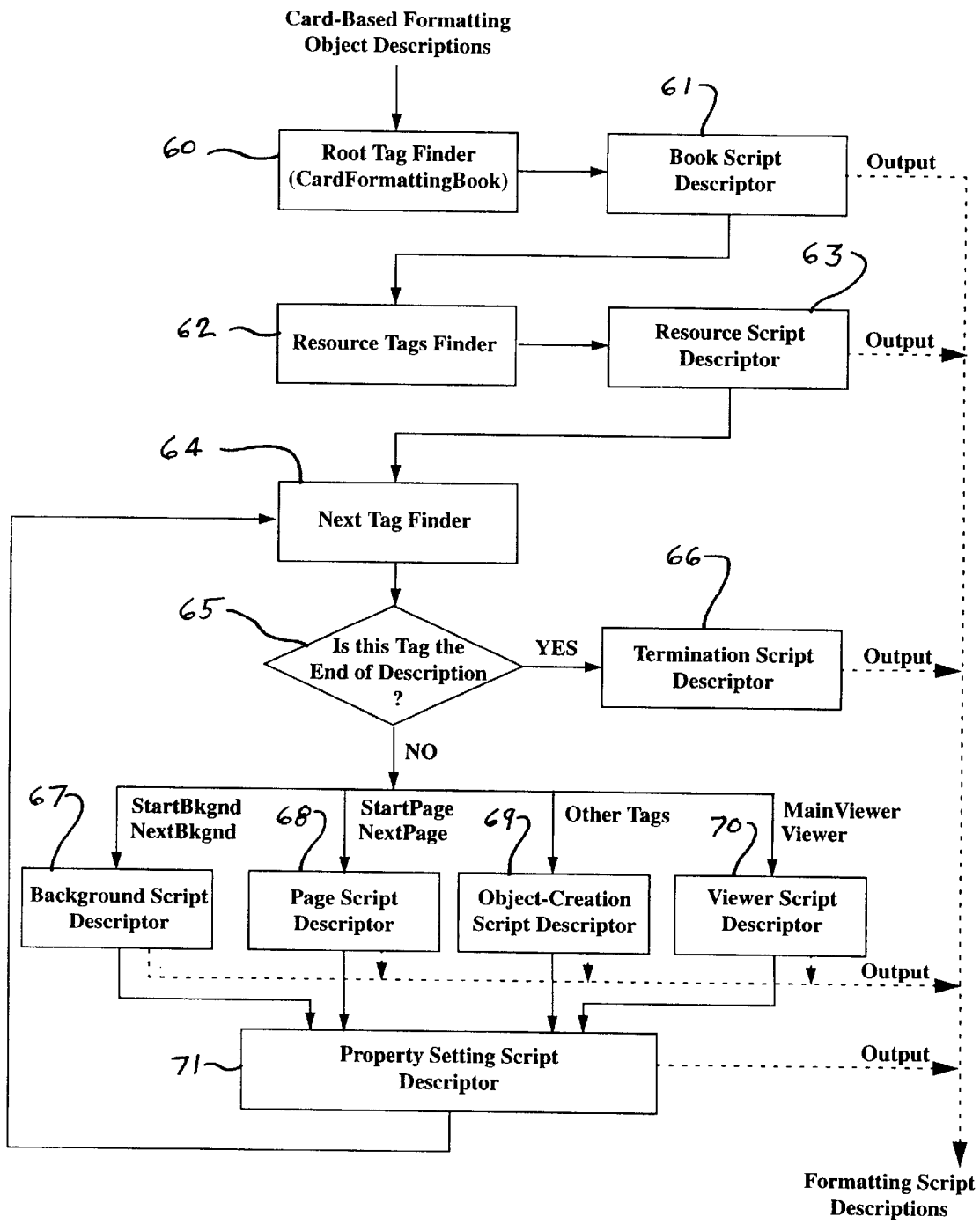
FIG. 6 illustrates a flow diagram of the HCF generation process of the present invention.
Figure 7:
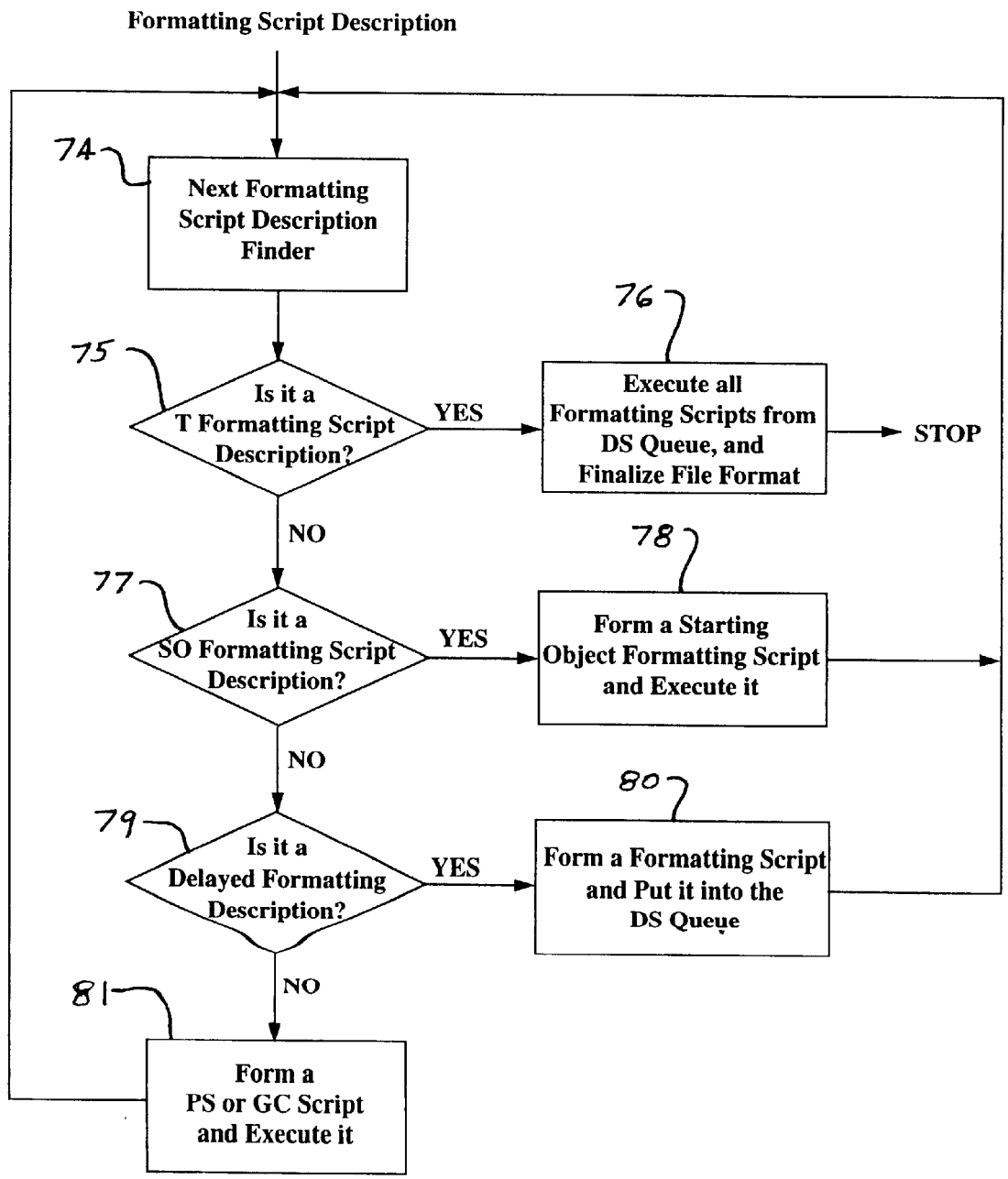
FIG. 7 illustrates a flow diagram of the formatting script interpreter of the present invention.

A block diagram of the automatic scripting module for the formatting process of the present invention is described in FIG. 3. It consists of two major components: Hypermedia Card Format (HCF) generator 32 and formatting script interpreter 34. HCF generator 32 takes card-based formatting object descriptions as an input, and generates a sequence of card-based formatting script descriptions as an output. Formatting script interpreter 34 takes the formatting script descriptions as an input and dynamically forms executable scripts for creating card-based hypermedia file format as the output. Further details of HCF generator 32 and formatting script interpreter 34 are shown in FIGS. 6 and 7 respectively.

Card-Based formatting object descriptions are procedural descriptions of formatting directives of document objects. Formatting script descriptions are used to describe how to create formatting scripts for document objects. These descriptions do not directly describe a document file format since the format representation may not be accessible in current hypermedia authoring tools. The automatic formatting process of the present invention needs to operate without relying on proprietary format information of the card-based hypermedia documents.

A card-based formatting object description consists of five major types of formatting directives. These formatting directives are used to indicate where and what formatting information is needed for generating formatting script descriptions for card-based hypermedia document objects. They are not used to describe a document format directly. Card-based hypermedia authoring tools often support script interpreters to create internal format representations of document objects with the object-creation commands. The formatting object descriptions are used to create descriptions about object-creation commands at run-time.

The types of formatting directives are: (1) document formatting directive for an overall book; (2) resource formatting directives for importing bitmaps, icons, etc.; (3) document window formatting directives such as main viewer (main window) and other menu or pop-up viewers (other windows); (4) card structure formatting directives such as first card, next card, first shared background, next shared background; and (5) card content objects formatting directives for buttons, pictures, etc.

Figure 4:
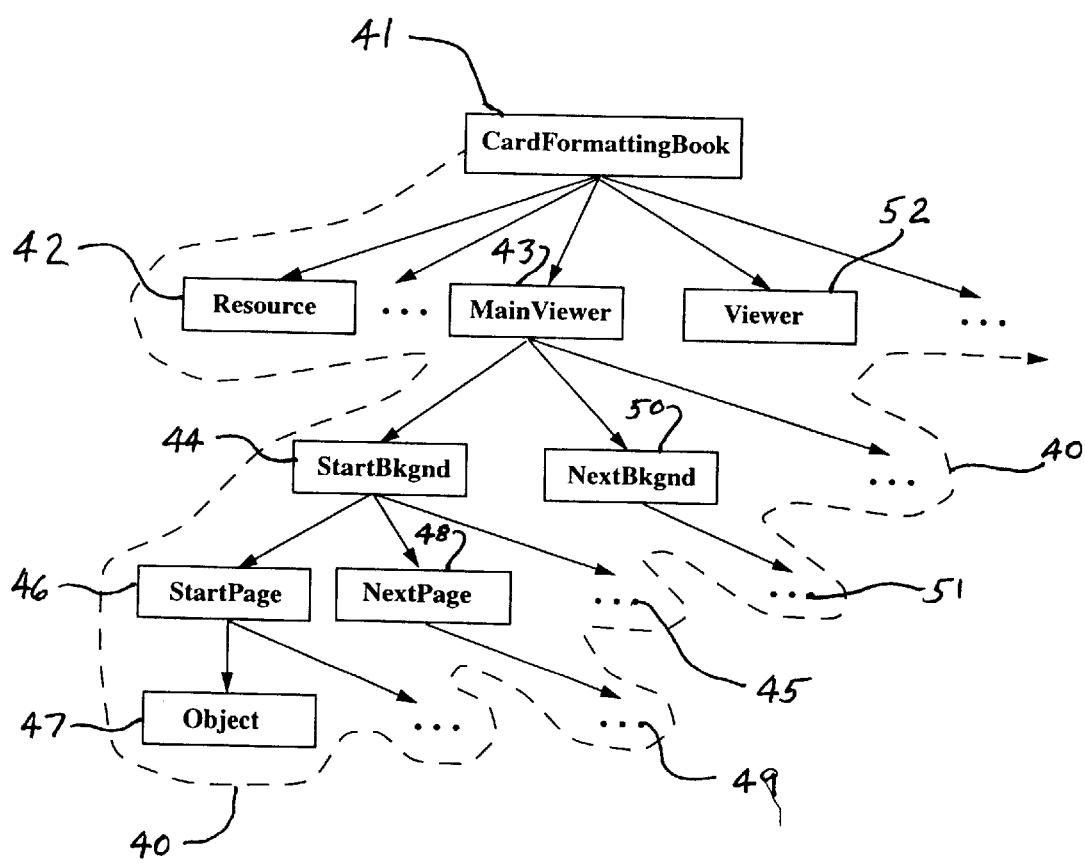
FIG. 4 illustrates a formatting directive description structure and procedural formatting sequence.

Typically, formatting object descriptions that encapsulate different types of formatting directives for a hypermedia document form a hierarchical structure called a formatting directive description structure. This is illustrated in FIG. 4. The formatting directive description structure represented in SGML is called a structured formatting object description. This is illustrated in FIG. 5. It describes the relationships among card-based formatting object descriptions and their properties. The reference SGML ISO 8879: 1986 Text and Office System—Standards Generalized Markup Language, Geneva, 1986, describes the SGML syntax.

A procedural formatting sequence (PFS) 40, shown as a dotted line in FIG. 4, is obtained by a depth-first traversal of the formatting directive description structure. A PFS 40 begins with a general book object (CardFormattingBook) 41, book resources (Resource) 42 and the main window object (MainViewer) 43, followed by its first shared background (StartBkgnd) 44 and background objects (Objects) 45, its first card's foreground (StartPage) 46 and its foreground objects (Objects) 47, next card's foreground (NextPage) 48 and its foreground objects (Objects) 49, next shared background (NextBkgnd) 50 and its background objects (Objects) 51, and then followed by other menus or pop-up window objects (Viewers) 52. This PFS 40 is used by the HCF generator to convert structured formatting object descriptions into sequential formatting script descriptions. The formatting script descriptions are then transformed into executable format scripts which, when interpreted, generate the final card-based hypermedia document format in a one-pass process.

A formatting script description file consists of a sequence of descriptions about formatting scripts. The HCF generator creates this script description file from a formatting description file. The formatting script interpreter takes the formatting script description file as an input and generates an internal file format for all card-based hypermedia document objects with property values as an output. These formatting script descriptions can be categorized as one of the following types: SO, GC, PC and T.

Starting Object Script Descriptions (SO) is for describing formatting scripts for starting an object by either creating a new document object or by visiting old objects. The syntax is shown as follows:

CREATE=object-name
COMMAND=object-creation-script
There are five cases of SO formatting script descriptions:
Case A: Starting an object by creating a new object
CREATE="Button"
COMMAND="Draw button from 100, 200, 400, 400"
Case B: Starting a page by creating a new page
CREATE="Page"
COMMAND="Send newpage"
Case C: Starting a page by visiting current page's foreground
CREATE="page"
COMMAND="Send foreground"
Case D: Starting a background by creating a new background
CREATE="Background"
command="Send newbackground"

Case E: Starting a background by visiting current page's background
CREATE="Background"
COMMAND="Send background"

Property Setting Script Descriptions (PS) is for describing formatting scripts for setting object property values. The syntax is shown as follows:
Property-name=Property-value
Example: A formatting script description for setting value of the property "bounds"for a particular document object
bounds="20, 20, 40, 40"

General Command Script Descriptions (GC) is for describing formatting scripts for particular script commands. The syntax is shown as follows:
COMMAND=script
Example: A formatting script description for moving an object position
COMMAND="Move button AIU by 40, 40"
Example: A formatting script description for importing a document resource file
COMMAND="Import bitmap resource
'c:resourcebutton.bmp' as 'NEXT'"

Terminating Script Descriptions (T) is for describing formatting scripts for finalization of documents at the end of a formatting script description file. The syntax is shown as follows:
DONE=book-name FIG. 6 illustrates the HCF generation process which is used to transform a structured formatting description into a sequential formatting script description. The HCF Generator mainly consists of various script descriptors for various types of document objects, which when executed, generate formatting script descriptions in the correct sequence.

As stated above, the input to the HCF generator is card-based formatting object descriptions. These descriptions enter root tag finder (CardFormattingBook) 60 and flow to book script descriptor 61. Book script descriptor 61 is for generating SO-type formatting script descriptions for general book characteristics of the card-based hypermedia documents. These SO-type descriptions flow through resource tags finder 62 to resource script descriptor 63 which is for generating GC-type formatting script descriptions for all resources such as bitmaps, icons, etc. needed in the card-based hypermedia documents. The GC-type formatting script descriptions then flow through next tag finder 64 to end of description decision block 65 where the question is raised as to whether this tag is the end of the description. If the answer is yes, the signals flow to termination script descriptor 66 which generates T-type formatting script descriptions for finalization of internal format representation of an entire hypermedia document. If the answer is no, the signals flow to background script descriptor 67, page script descriptor 68, object creation script descriptor 69 and viewer script descriptor 70.

Background script descriptor 67 generates SO-type formatting script descriptions for creating new background (Case D for NextBkgnd) or visiting current page's background (Case E for StartBkgnd). Foreground script descriptor 68 generates SO-type formatting script descriptions for creating new page (Case B for StartPage) or visiting current page's foreground (Case C for NextPage). Object creation script descriptor 69 generates SO-type formatting script descriptions for creating new document objects. Viewer script descriptor 70 generates SO-type formatting script descriptions for the main window and specialized window/menu/dialog box.

The outputs of the above four descriptors flow to property setting script descriptor 71 which generates PS-type formatting script descriptions for setting property values.

The formatting script interpreter shown in FIG. 7 takes as an input sequential formatting script descriptions, and generates as an output the formatting scripts for a hypermedia authoring tool. The formatting script interpreter is designed as a simple and fast parsing procedure to dynamically form tool-specific scripts from script descriptions. The formatting script descriptions indicate how to form real executable scripts. The final scripts will be executed by authoring tools for creating an internal format representation of card-based hypermedia documents.

The formatting script descriptions flow through next formatting script description finder 74 to T formatting script description decision block 76. If it is a T formatting script description the signal flows through execute/finalize 76 and on to stop. If it is not a T formatting script description the signal flows to SO formatting script description decision block 77. If it is a SO formatting script description the signal flows through form/execute 78 and returns to next formatting script description finder 74. If it is not a SO formatting script description the signal flows to delayed formatting script description decision block 79. If it is a delayed formatting script description the signal flows through form/put 80 and returns to next formatting script description finder 74. If it is not a delayed formatting script description the signal flows through form a PS or GC/execute 81 and returns to next formatting script description finder 74.

In general, the execution order of executable formatting scripts follows the sequence of formatting script descriptions except for delayed formatting script description decision block 79. Delayed formatting script descriptions are those descriptions that could interrupt a normal formatting process when immediately executed. For example, those formatting script descriptions are used for setting object properties visible and script. Once the value of property visible of an object is set to be false, it will make this object immediately invisible, and thus other property values of this object cannot be set any more due to the invisibility. In another case, if the script property of an object includes references to other objects which have not yet been created at the time of creating this object. These forward references will be prohibited by authoring tools. For delayed formatting script descriptions, the formatting script interpreter still forms the executable scripts for these properties but puts them in a DS (Delayed Script) queue in form/put 80 and executes the entries in this queue after handling all other formatting script descriptions.

With the present invention, by following a particular sequence of formatting script descriptions, the formatting script interpreter only needs to parse formatting script descriptions once and handles each script description independently of other script descriptions without waiting.

The script-based formatting process of the present invention provides an automated procedure for creating large-scale document files for commercial card-based hypermedia authoring tools. This automated procedure is provided through the following:

1. An automatic script-based formatting process is designed for creating card-based hypermedia document formats for commercial hypermedia authoring tools by computer programs without the knowledge of the proprietary format information. The process takes card-based formatting object descriptions as input, and generates a formatting script as output. It consists of two major components: an HCF Generator for creating card-based formatting script descriptions and a Formatting Script Interpreter for dynamically generating executable formatting scripts from script descriptions.

2. The formatting object descriptions are encoded as a structured SGML document to represent procedural formatting directives for overall card-based document, resource, page, background and all kinds of objects for card-based hypermedia documents.
3. The HCF Generator creates a PFS (procedural formatting sequence) of card-based formatting object descriptions for creating a correct sequence of formatting script descriptions.
4. The card-based formatting script descriptions are designed to form formatting scripts when interpreted.
5. The formatting script interpreter is designed as a sequential, one-pass formatting procedure for generating electronic file formats for card-based hypermedia documents.

None of these elements are present in existing card-based hypermedia authoring tools which currently only support interactive formatting methods. It is not intended that this invention be limited to the hardware arrangement, software arrangement or operational procedures shown disclosed. This invention includes all of the alterations and variations thereto as encompassed within the scope of the claims as follows.

What is claimed is:

1. A system for formatting card-based hypermedia documents by automatic scripting, comprising:
   a mixer for receiving document style and document content and for providing card-based formatting object descriptions that encapsulate different types of procedural formatting directives for said card-based hypermedia documents; and
   automatic scripting module connected to said mixer for receiving said card-based formatting object descriptions and for providing formatting scripts executable by a hypermedia authoring tool to format said card-based hypermedia documents;
   wherein said automatic scripting module comprises,
      an HCF generator for receiving said card-based formatting object descriptions and for providing card-based formatting script descriptions; and
      a formatting script interpreter connected to said HCF generator for receiving said card-based formatting script descriptions and for providing said card-based hypermedia documents; and
   wherein said HCF generator comprises,
      script descriptors for document objects which, when executed, generate said card-based formatting script descriptions in a correct sequence; and
   wherein said script descriptors comprise,
      book script descriptor;
      resource script descriptor;
      background script descriptor;
      page script descriptor;
      object-creation script descriptor;
      viewer script descriptor;
      property setting script descriptor; and
      termination script descriptor.

2. A system for formatting card-based hypermedia documents by automatic scripting as claimed in claim 1, wherein said formatting script interpreter comprises:
   parsing means to form tool-specific scripts from said card-based formatting script descriptions.

3. A system for formatting card-based hypermedia documents by automatic scripting, comprising:
   a mixer for receiving document style and document content and for providing card-based formatting object descriptions that encapsulate different types of procedural formatting directives for said card-based hypermedia documents; and
   automatic scripting module connected to said mixer for receiving said card-based formatting object descriptions and for providing formatting scripts executable by a hypermedia authoring tool to format said card-based hypermedia documents;
   wherein said automatic scripting module comprises,
      an HCF generator for receiving said card-based formatting object descriptions and for providing card-based formatting script descriptions; and
      a formatting script interpreter connected to said HCF generator for receiving said card-based formatting script descriptions and for providing said card-based hypermedia documents; and
   wherein said HCF generator comprises,
      a root tag finder to analyze said card-based formatting object descriptions and to provide a root tag;
      a book script descriptor to process said root tag and to provide a book formatting script description;
      a resource tag finder to find all resource tags;
      a resource script descriptor to process said resource tags and to provide a resource formatting script description;
      a next tag finder to find a next tag;
      an end of description decision to find an end tag;
      a termination script descriptor to process said end tag and to provide a termination formatting script description;
      background/page/object-creation/viewer script descriptors to process said next tag and to provide a background/page/object-creation/viewer formatting script description; and
      a property setting script descriptor to provide a property setting formatting script description.

4. A system for formatting card-based hypermedia documents by automatic scripting, comprising:
   a mixer for receiving document style and document content and for providing card-based formatting object descriptions that encapsulate different types of procedural formatting directives for said card-based hypermedia documents; and
   automatic scripting module connected to said mixer for receiving said card-based formatting object descriptions and for providing formatting scripts executable by a hypermedia authoring tool to format said card-based hypermedia documents;
   wherein said automatic scripting module comprises,
      an HCF generator for receiving said card-based formatting object descriptions and for providing card-based formatting script descriptions; and
      a formatting script interpreter connected to said HCF generator for receiving said card-based formatting script descriptions and for providing said card-based hypermedia documents; and
   wherein said formatting script interpreter comprises,
      a next formatting script description finder for obtaining a next formatting script description;
      a T formatting script description decision to analyze said next formatting script description and to find a T formatting script description;
      execute and finalize means connected to a first output of said T formatting script description decision;
      a SO formatting script description decision to analyze said next formatting script description and to find a SO formatting script description;

form and execute means connected between a first
output of said SO formatting script description decision and an input of said next formatting script description finder;
a delayed formatting script description decision to analyze said next formatting script description and to find a delayed formatting script description;
form and put queue means connected between a first output of said delayed formatting script description decision and said input of said next formatting script description finder; and
form script and execute means connected between a second output of said delayed formatting script description decision and said input of said next formatting script description finder.

5. A method for formatting card-based hypermedia documents by automatic scripting, comprising the steps of:
mixing document style and document content to provide card-based formatting object descriptions that encapsulate different types of procedural formatting directives for said card-based hypermedia documents; and
analyzing said card-based formatting object descriptions to provide formatting scripts executable by a hypermedia authoring tool to format said card-based hypermedia documents;
wherein analyzing said card-based formatting object descriptions comprises the steps of,
receiving said card-based formatting object descriptions;
generating card-based formatting script descriptions;
interpreting said card-based formatting script descriptions; and
providing said card-based hypermedia documents;
wherein generating card-based formatting script descriptions comprises the step of,
describing scripts for documents objects which, when executed, generate said card-based formatting script descriptions in a correct sequence; and
wherein describing scripts for documents objects comprises the steps of,
book describing a book script;
resource describing a resource script;
background describing a background script;
page describing a page script;
object-creation describing an object-creation script;
viewer describing a viewer script;
property setting describing a property setting script; and
termination describing a termination script.

6. A method for formatting card-based hypermedia documents by automatic scripting, comprising the steps of:
mixing document style and document content to provide card-based formatting object descriptions that encapsulate different types of procedural formatting directives for said card-based hypermedia documents; and
analyzing said card-based formatting object descriptions to provide formatting scripts executable by a hypermedia authoring tool to format said card-based hypermedia documents;
wherein analyzing said card-based formatting object descriptions comprises the steps of,
receiving said card-based formatting object descriptions;
generating card-based formatting script descriptions;
interpreting said card-based formatting script descriptions; and
providing said card-based hypermedia documents; and
wherein generating card-based formatting script descriptions comprises the steps of,
finding a root tag;
book generating a book formatting script description;
resource finding all resource tags;
resource generating a resource formatting script description;
next finding a next tag;
deciding if an end tag;
termination generating a termination formatting script description;
background generating a background/page/object-creation/viewer formatting script description; and
property generating a property setting formatting script description.

7. A method for formatting card-based hypermedia documents by automatic scripting as claimed in claim 6, wherein interpreting said card-based formatting script descriptions comprises the step of:
parsing to form tool-specific scripts from said card-based formatting script descriptions.

8. A method for formatting card-based hypermedia documents by automatic scripting, comprising the steps of:
mixing document style and document content to provide card-based formatting object descriptions that encapsulate different types of procedural formatting directives for said card-based hypermedia documents; and
analyzing said card-based formatting object descriptions to provide formatting scripts executable by a hypermedia authoring tool to format said card-based hypermedia documents;
wherein analyzing said card-based formatting object descriptions comprises the steps of,
receiving said card-based formatting object descriptions;
generating card-based formatting script descriptions;
interpreting said card-based formatting script descriptions; and
providing said card-based hypermedia documents;
wherein interpreting said card-based formatting script descriptions comprised the steps of,
obtaining a next card-based formatting script description;
deciding formatting script descriptions;
forming scripts; and
executing said scripts; and
wherein deciding formatting script descriptions comprises the steps of,
T deciding a T formatting script description;
SO deciding a SO formatting script description; and
delayed deciding a delayed formatting script description.

9. A method for formatting card-based hypermedia documents by automatic scripting, comprising the steps of:
mixing document style and document content to provide card-based formatting object descriptions that encapsulate different types of procedural formatting directives for said card-based hypermedia documents; and
analyzing said card-based formatting object descriptions to provide formatting scripts executable by a hypermedia authoring tool to format said card-based hypermedia documents;
wherein analyzing said card-based formatting object descriptions comprises the steps of,
receiving said card-based formatting object descriptions;

generating card-based formatting script descriptions;
interpreting said card-based formatting script descriptions; and
providing said card-based hypermedia documents; and
wherein interpreting said card-based formatting script descriptions comprises the steps of,
  obtaining a next formatting script description for analyzing and deciding type of formatting script descriptions;
  T finding a T formatting script description and executing all formatting scripts from a queue and finalizing file format;
  SO finding a SO formatting script description and forming a starting object formatting script and executing said starting object formatting script;
  delayed finding a delayed formatting script description and forming a formatting script and putting said formatting script in said queue; and
  PS or GC finding a PS or GC formatting script description and forming a PS or GC script and executing said PS or GC script.

* * * * *